United States Patent
Kapila et al.

(10) Patent No.: US 11,220,873 B2
(45) Date of Patent: Jan. 11, 2022

(54) RECOVERED DRILLING FLUID FORMULATION

(71) Applicant: Halliburton Energy Services, Inc., Houston, TX (US)

(72) Inventors: Rajesh C. Kapila, Houston, TX (US); Casey T. Lesar, Houston, TX (US); Mukesh Kapila, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/433,802

(22) Filed: Jun. 6, 2019

(65) Prior Publication Data

US 2020/0208476 A1  Jul. 2, 2020

Related U.S. Application Data

(60) Provisional application No. 62/785,874, filed on Dec. 28, 2018.

(51) Int. Cl.
*E21B 21/06* (2006.01)
*B01D 5/00* (2006.01)

(52) U.S. Cl.
CPC ............ *E21B 21/063* (2013.01); *B01D 5/006* (2013.01); *B01D 5/0027* (2013.01); *E21B 21/062* (2013.01); *E21B 21/065* (2013.01)

(58) Field of Classification Search
CPC ...................................................... E21B 21/00
See application file for complete search history.

(56) References Cited

U.S. PATENT DOCUMENTS

| 4,319,410 A | * | 3/1982 | Heilhecker | B01D 3/10 175/207 |
| 9,725,973 B2 | | 8/2017 | Ayapbergenov et al. | |
| 2007/0170118 A1 | * | 7/2007 | Browne | B01D 17/0202 210/708 |
| 2008/0277165 A1 | * | 11/2008 | Nah | E21B 21/066 175/66 |
| 2010/0326655 A1 | | 12/2010 | Jones et al. | |
| 2014/0151343 A1 | | 6/2014 | Foret | |
| 2017/0138134 A1 | * | 5/2017 | Walker | E21B 21/062 |
| 2017/0298703 A1 | | 10/2017 | Ross et al. | |

FOREIGN PATENT DOCUMENTS

| CN | 204040960 | 12/2014 |
| CN | 105781455 | 7/2016 |
| EP | 1792042 | 1/2009 |
| WO | WO2017/190227 | * 11/2017 |

OTHER PUBLICATIONS

Halliburton, BaraPhase tm Thermomechanical Cuttings Cleaner (TCC), Datasheet, 2016.
International Search Report for Application PCT/US2019/035891 dated Oct. 4, 2019.

* cited by examiner

*Primary Examiner* — Angela M DiTrani Leff
*Assistant Examiner* — Avi T Skaist
(74) *Attorney, Agent, or Firm* — Tenley Krueger; C. Tumey Law Group PLLC (57) ABSTRACT

A method may include: heating a drilling waste comprising water, oil, and solid particulate; vaporizing at least a portion of the water and oil from the drilling waste to form a vaporized fluid, wherein the step of vaporization is performed at a pressure less than about 101.325 kPa; and condensing the at least a portion of the water and oil to form a recovered fluid emulsion.

20 Claims, 4 Drawing Sheets

RECOVERED DRILLING FLUID FORMULATION

BACKGROUND

Drilling fluids may be circulated through a wellbore during a drilling operation, for example, to remove cuttings (i.e., small pieces of the formation that break away during drilling) and to cool the drill bit. In some instances, drilling fluids are an oil-based fluid that includes a weighting agent. Drilling fluids may also be referred to as drilling muds and the terms are interchangeable. Typically, weighting agents include particles of high-density minerals that increase the density of the drilling fluid. Increasing the density of the drilling fluid may help to stabilize the wellbore and mitigate formation fluid intrusion into the wellbore. As drilling fluids are circulated through the wellbore during the drilling process, the drilling fluids collect drilled solids or "cuttings." These cuttings may affect the properties of the drilling fluid and therefore should be removed before the drilling fluid can be returned to the drill string. Oftentimes mechanical methods such as vibrating screens and centrifuges may be employed to remove cuttings from drilling fluids. Mechanical methods may be effective at removing relatively larger sized drill cuttings. However, as drilling is continued the cuttings may be broken down into smaller and smaller particle sizes which may become difficult to remove by mechanical means such as filtering and centrifuging. As the particle size of cuttings becomes sufficiently small, surface effects may become a significant determining factor in the feasibility of separation. The small particle size drill cuttings may be suspended in the drilling fluid in a similar manner to a colloid. Eventually the drilling fluid becomes loaded with drill cutting particles that cannot be removed through mechanical means and the drilling fluid may be considered spent. The solids that are not removed from the drilling fluid may change the physical properties of the drilling fluids thereby rendering the drilling fluid unsuitable for use.

Conventional methods for treating spent drilling fluids include diluting the drilling fluid to reduce the concentration of solids. However, dilution has several drawbacks including that the storage requirements for drilling fluid increase with every dilution. Additionally, since the small particle size cuttings are not removed, the drilling fluids remain contaminated and thus can retain some undesirable properties.

BRIEF DESCRIPTION OF THE DRAWINGS

These drawings illustrate certain aspects of some of the present disclosure and should not be used to limit or define the disclosure.

DETAILED DESCRIPTION

The embodiments described herein may relate to methods and processes for recovering oils and water from solids-laden invert emulsion drilling fluids and solids contaminated with drilling fluids. The recovered oils and water may be referred to as a recovered fluid emulsion which may be used as a basis for building a drilling fluid.

Invert emulsion drilling fluids are drilling fluids in which oil is the continuous or external phase and water is the internal phase. Invert emulsions may also be referred to as an oil-base muds, and the terms are considered synonyms. Invert emulsion drilling fluids may include about 5% to about 100% oil. Invert emulsion drilling fluids may include water, oil, and additives to impart desirable properties on the invert emulsion drilling fluid to make the invert emulsion drilling fluid suitable for use as a drilling fluid. As discussed above, the invert emulsion drilling fluid may be used in a wellbore drilling operation to lift cutting out of a wellbore, cool a drill bit, and provide hydrostatic pressure against the wellbore walls. The drilling process may contaminate the invert emulsion drilling fluid with difficult to remove solids, thereby leading to a solids-laden drilling fluid with properties that are unsuitable for the intended purpose as a drilling fluid. A solids-laden drilling fluid may contain any volume of solids content including from about 0.01% by volume solids to about 99.99% by volume solids. The process described herein may be suitable for treating solids-laden drilling fluids containing nearly entirely fluid and to and including solids with drilling fluids adsorbed thereon. Furthermore, although the processes described herein may be referred to as treating solids-laden drilling fluids, the process may be used to treat other fluids or drilling waste generated during the drilling process such as shaker overflow, for example.

The process described herein may remove at least a portion of the water and oils in a solids-laden drilling fluid to generate a recovered fluid emulsion which may be then be rebuild to an invert emulsion drilling fluid. The recovered fluid emulsion may have some properties of drilling fluids but may not be suitable for use as a drilling fluid without further processing and the addition of drilling fluid additives. As mentioned above, drilling fluid additives impart desirable properties on the drilling fluid such as, without limitation, density, rheology, fluid loss control, formation compatibility, emulsion stability, among many other properties. In some examples, the recovered fluid emulsion may be combined with a drilling fluid to form a partially recycled fluid. The drilling fluid that is combined with the recovered fluid emulsion may be partially spent or spent drilling fluid, for example. A partially spent drilling fluid may be a drilling fluid which has been used at least once to drill a wellbore and therefore may contain at least some cuttings material. The recovered fluid emulsion may be added to dilute the partially spent or spent drilling fluid to such that the concentration of solids in the resultant fluid is reduced. In another example, the recovered fluid emulsion may be used as a basis for building a drilling fluid such that a reduced amount of oil and/or water may be required to produce the drilling fluid. The recovered fluid emulsion may be combined with additional oil, water, and/or additives such that the resultant drilling fluid has desired properties.

An invert emulsion drilling fluid may include an aqueous phase, an oil phase, and drilling fluid additives. The aqueous phase may include, without limitation, fresh water, salt water (e.g., water containing one or more salts dissolved therein such as sodium chloride, calcium chloride, and calcium nitrate), brines (e.g., saturated or near saturated salt water), or any other aqueous phase composition that is suitable for use in an invert emulsion drilling fluid. The oil phase may include a natural or synthetic hydrocarbon such as, without limitation, diesel, kerosene, fuel oil, crude oil, mineral oil, an alkane, an olefin, an aromatic organic compound, a cyclic alkane, a paraffin, and synthetic oils such as alpha-olefins and esters, for example.

In an invert emulsion drilling fluid, the oil is the external or continuous phase and may be present in any amount from about 50 vol. % to about 99 vol. % of the invert emulsion drilling fluid. Conversely, the aqueous phase may be present in any amount from about 50 vol. % to about 1 vol. % of the invert emulsion drilling fluid. In some examples, an invert emulsion drilling fluid may have an oil-to-water ratio from a lower limit of greater than about 50:50, 55:45, 60:40, 65:35, 70:30, 75:25, or 80:20 by volume in the invert emulsion drilling fluid to an upper limit of less than about 100:0, 95:5, 90:10, 85:15, 80:20, 75:25, 70:30, or 65:35 by volume in the invert emulsion drilling fluid, where the oil-to-water ratio may range from any lower limit to any upper limit and encompass any subset there between. When an invert emulsion drilling fluid is circulated through a drill string during a drilling operation, the drilling fluid may pick up solid particulate such as cuttings and fines to become a solids-laden drilling fluid. A solids-laden invert-emulsion drilling fluid may include any mass fraction of solids, including, but not limited to, from about 0.01% by volume solids to about 99.99% by volume solids or greater.

The rebuilt drilling fluids described herein may utilize a recovered fluid emulsion as a base to which additional oil, water, and drilling fluid additives may be combined with to make a drilling fluid with desirable properties. The oil may be any oil, including, but not limited to, alpha-olefins, internal olefins, alkanes, aromatic solvents, cycloalkanes, liquefied petroleum gas, kerosene, diesel oils, crude oils, gas oils, fuel oils, paraffin oils, mineral oils, esters, amides, synthetic oils (e.g., polyolefins), siloxanes, organosiloxanes, ethers, acetals, dialkylcarbonates, and combinations thereof. The water added may include any water as previously described. Some drilling fluid additives may include, without limitation, weighting additives such as barium sulfate, calcium carbonate, hematite, ilmetite, and galena, for example, fluid loss additives, thinners, dispersants, surfactants, pH control additives, $H_2S$ scavengers, bacteriacides, defoamers, or any other drilling fluid additives. The drilling fluid may be formulated to have any properties including, but not limited to, density, viscosity, fluid loss control, rheology, funnel viscosity, plastic viscosity, yield point, gel strength, pH, emulsion stability, among others Some embodiments described herein may include using a thermal desorption process performed under vacuum to treat solids-laden invert emulsion drilling fluids. Thermal desorption may include introducing the solids-laden invert emulsion drilling fluid into a vessel, heating the solid-laden invert emulsion drilling fluid in the vessel, and removing a vapor stream including at least a portion of the oil phase and aqueous phase from the invert emulsion drilling fluid. The heat may be provided from any source, including, but not limited to, a direct fired heater, an indirect fired heater, thermo-mechanical heating such as by a thermal screw, or any other suitable heating method. In some examples, the presence of both the water and oil under vacuum (i.e. less than atmospheric pressure) may allow for the processing temperature to be less than the atmospheric boiling point of the oil (i.e., the boiling point of the oil at atmospheric pressure). The lower operating temperature in addition to limiting the amount of oxygen in the systems may, in some instances, provide for mitigation of oil cracking and degradation. The vapor stream including oil and water may be condensed to produce a recovered fluid emulsion which may be used as a basis to build a drilling fluid as described above. Simultaneously evaporating then condensing the oil and water may have several advantages including that the equipment footprint is reduced such that the process may be performed as part of a wellbore drilling operation.

Figure 1:
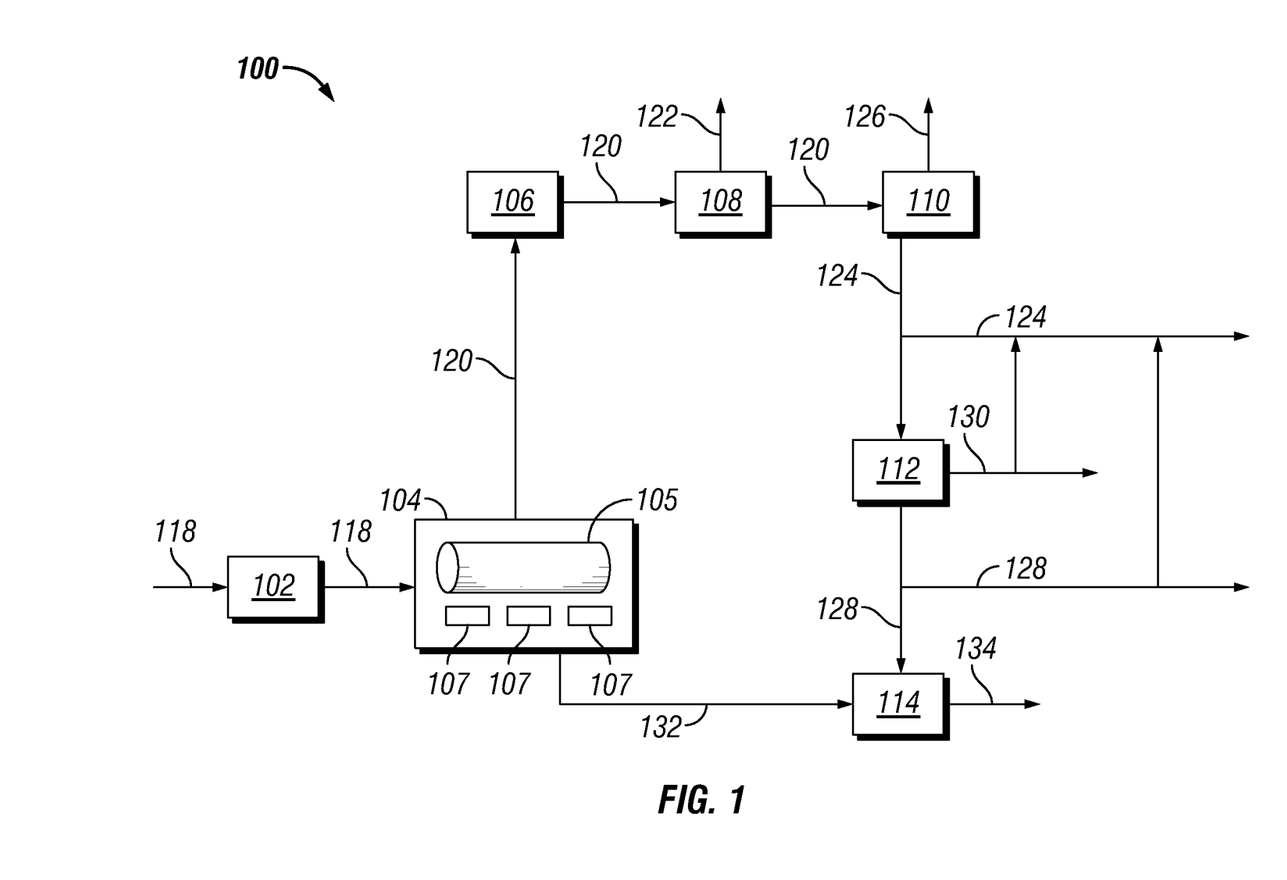
FIG. 1 illustrates a system and method for recovering an invert emulsion from a spent drilling fluid.

FIG. 1 illustrates drilling fluid recovery system 100 which processes and treats a solid-laden invert emulsion drilling fluid to produce a recovered fluid emulsion. Drilling fluid recovery system 100 may include conveyance unit 102 to which a solids-laden drilling fluid 118 is loaded and mixed. Solids-laden drilling fluid 118 may be the same solids-laden drilling fluid previously described above or drilling waste generated during the drilling process. Solids-laden drilling fluid 118 may be from any source including, but not limited to, from a mud pit, from a flow line, or from a tank, for example. In examples where drilling fluid recovery system 100 is deployed at a wellbore drilling operation, solids-laden drilling fluid 118 may be delivered to drilling fluid recovery system 100 from a flow line after a shaker screen or centrifuge, for example. Conveyance unit 102 may include equipment that conveys and mixes solids-laden drilling fluid 118 to heating unit 104. Conveyance unit 102 may include equipment such as, without limitation, augers, mixer hoppers, pumps, and other equipment configured to mix and/or convey solids-laden drilling fluid 118.

Heating unit 104 may include a vessel 105 into which solids-laden drilling fluid 118 is introduced by conveyance unit 102. Vessel 105 may include a conveyance, such as one or more screws or augers, which continuously or intermittently rotate as solids-laden drilling fluid 118 is introduced therein. Heating unit 104 may further include one or more heating elements 107 which may supply heat to heating unit 104. The heating element 107 may include any suitable heating element including heating elements such as electric heating elements embedded in vessel 105, electric heating elements disposed around the rotary vessel to provide radiant heat into the rotary vessel, a fired heater such as a furnace, or any other suitable heating element. In some examples, heating unit 104 may include control systems configured to regulate a temperature within the rotary vessel such that the temperature and rate of heat transfer into solids-laden drilling fluid is controlled. The control system may increase or reduce temperature by controlling the heating element, for example.

Heating unit 104 may be operated at any temperature suitable for generating vapor stream 120. For example, heating unit 104 may be operated at a temperature at a point in a range of about 100° C. to about 500° C. Alternatively, heating unit 104 may be operated at a temperature at a point in a range of about 100° C. to about 150° C., at a point in a range of about 150° C. to about 200° C., at a point in a range of about 200° C. to about 250° C., at a point in a range of about 250° C. to about 300° C., at a point in a range of about 300° C., to about 350° C., at a point in a range of about 350° C. to about 400° C., at a point in a range of about 400° C. to about 450° C., or at a point in a range of about 450° C. to about 500° C. In a particular example, heating unit 104 may be operated within a temperature range of about 300° C. to about 500° C.

Heating unit 104 may be operated at any pressure suitable for generating vapor stream 120. For example, heating unit 104 may operate at a pressure less than atmospheric pressure (101.325 kPa) including at a pressure at a point in a range of about 0 kPa to about 94 kPa. Alternatively, heating unit 104 may operate at a pressure at a point in a range of about 0 kPa to about 10 kPa, at a point in a range of about 10 kPa to about 20 kPa, at a point in a range of about 20 kPa to about 30 kPa, at a point in a range of about 30 kPa to about 40 kPa, at a point in a range of about 40 kPa to about 50 kPa, at a point in a range of about 50 kPa to about 60 kPa, at a point in a range of about 60 kPa to about 70 kPa, at a point in a range of about 70 kPa to about 80 kPa, or at a point in a range of about 80 kPa to about 94 kPa. In a particular embodiment, heating unit 104 may operate at a pressure at a point in a range of about 30 kPa to about 70 kPa.

As solids-laden drilling fluid 118 is introduced into heating unit 104, the heat supplied by the heating element 107 may increase the temperature of solids-laden drilling fluid 118 and cause at least a portion of the oil and water present in the solids-laden drilling fluid 118 to evaporate as vapor stream 120. As heating unit 104 operates at less than atmospheric pressure and no additional oxygen is present in heating unit 104, the water and oil may be simultaneously evaporated without degradation or cracking of the oil. In some examples, heat may be supplied by frictional heat generated from frictional interaction between the solids present in the solids-laden drilling fluid. In a frictional heating embodiment, a screw or auger may compress and push solid particulate together, thereby causing friction between the solid particulates and raising the temperature of the solids-laden drilling fluid. A solids stream 132 including at least a portion of solids present in solids-laden drilling fluid 118 may also be produced in heating unit 104. Vapor stream 120 may include oil, water, solids, and drilling fluid additives that are present in solids-laden drilling fluid 118. Vapor stream 120 may optionally be introduced into filter unit 106 to remove at least a portion of solids, if any, that may be present in vapor stream 120. Filter unit 106 may include equipment configured to remove solids such as, without limitation, filters, cyclones, and other separation devices. From filter unit 106, vapor stream 120 may optionally be sent to condenser 108 whereby vapor stream 120 may be cooled and at least a portion of vapor stream 120 may be condensed. Condensed fluid 122 may be drawn down from condenser 108. Condensed fluid 122 may include heavier components of vapor stream 120 that condense at a relatively higher temperature than lighter components of vapor stream 120. The portion of vapor stream 120 that is not condensed in condenser 108 may be conveyed to condenser 110 whereby at least a portion of the remaining oil and water of vapor stream 120 may be condensed. Condenser 110 may separate a non-condensable gas stream 126 from a condensed stream 124. Non-condensable gas stream 126 may include gasses not normally condensable at atmospheric pressure such as nitrogen, for example if present. Condensed stream 124 may include the balance of oil and water from vapor stream 120 that is not removed in condensed fluid 122 and non-condensable gas stream 126. Alternatively, condenser 108 may not be included and condenser 110 may be operable to condense all water and oil present in vapor stream 120 for form condensed stream 124.

Condensed stream 124 may be a mixture of oil and water or may be an emulsified mixture of oil and water. Condensed stream 124 may be used without further processing as a basis to form a drilling fluid as described above. Alternatively, condensed stream 124 may be further processed in in oil/water separator 114 to produce recovered water stream 128 and a recovered oil stream 130. In some examples, a portion of condensed stream 124 may be further processed and optionally be recombined with a portion of recovered water stream 128 and/or a portion of recovered oil stream 130. In some examples, recovered oil stream 130 may also be used to form a drilling fluid. A portion of recovered water stream 128 may be used to wet solids stream 132 in rehydration unit 116. Additionally, solids collected from filter unit 106 may also be rehydrated in rehydration unit. A solids stream 134 may exit oil/water separator 114

In some examples, a system may include a control program and sensors for monitoring and executing various steps of the methods described herein. For example, heating unit 104 may include sensors for monitoring temperature, which may be used to guide the feed rate of solids-laden invert emulsion drilling fluid into heating unit 104, the feed rate of any conveyance mechanisms within vessel 105 in heating unit 104, and/or the rate at which solids are removed from heating unit 104. Condensed stream 124, and optionally any recovered water or recovered oil combined thereto, will be referred to hereon as recovered fluid emulsion. The recovered fluid emulsion may have some drilling fluid properties but may be unsuitable to be used as a drilling fluid by itself and thus may require further processing as will be described in further detail below.

Figure 2:
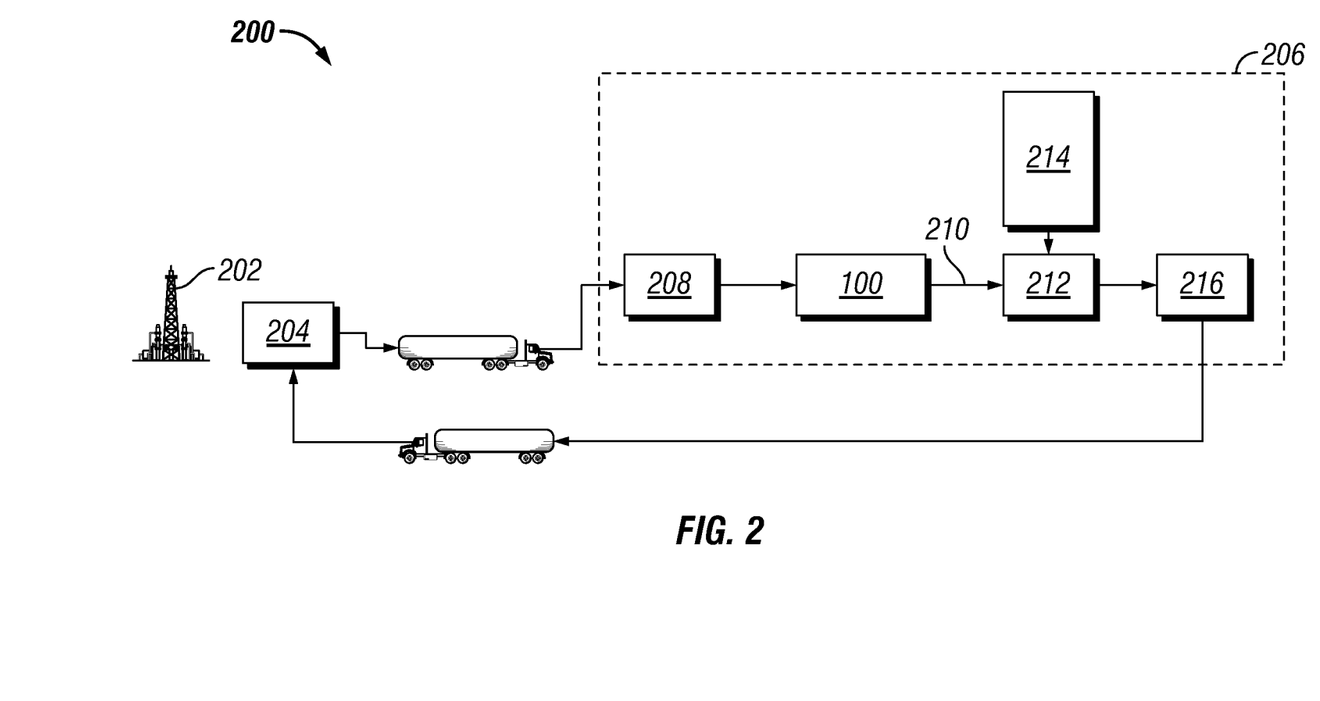
FIG. 2 illustrates a system and method treating spent drilling fluids at a liquid mud plant.

FIG. 2 illustrates a process 200 for using the recovered fluid emulsion from FIG. 1 to produce a drilling fluid. A drilling rig 202 may include mud storage 204 which may include pits, tanks, tankers, or any other suitable medium for mud storage. Mud storage 204 may store drilling fluids previously introduced into a wellbore including solids-laden invert emulsion drilling fluids as described above. The solids-laden invert emulsion drilling fluid from mud storage 204 may be transported to mud plant 206 for processing. Mud plant 206 may include mud storage 208 such as tanks, for example, which may store transported solids-laden invert emulsion drilling fluid for processing. Mud plant 206 may include process 100 described in FIG. 1 which may take as input solids-laden invert emulsion drilling fluid from mud storage 208 and produce a recovered fluid emulsion 210. Recovered fluid emulsion may have some properties of drilling fluids but may need additional processing in mixing unit 212 to produce a drilling fluid with desirable properties. Mixing unit 212 may include sampling equipment configured to sample recovered fluid emulsion 210 and to determine physical and chemical properties of recovered fluid emulsion 210. Examples of testing that could be done are; rheology, gel strength, density, emulsion stability, oil-water-solids ratio, fluid loss properties, additive concentration and salinity of the recovered fluid. This testing could be automated and done in real-time or samples could be extracted and tested in a facility on-site. Once physical and chemical properties of the recovered emulsion are determined, additives from additive storage 214 may be added to the recovered emulsion to build a drilling fluid with desired properties. Some drilling fluid properties may include, for example, density, viscosity, fluid loss control, rheology, funnel viscosity, plastic viscosity, yield point, gel strength, pH, emulsion stability, among others. Additives may include water, oil, solids, brine, and chemical additives, for example. The drilling fluid may be transported to reconditioned mud storage 230 whereby the drilling fluid may be stored until transported to a well site.

Figure 3:
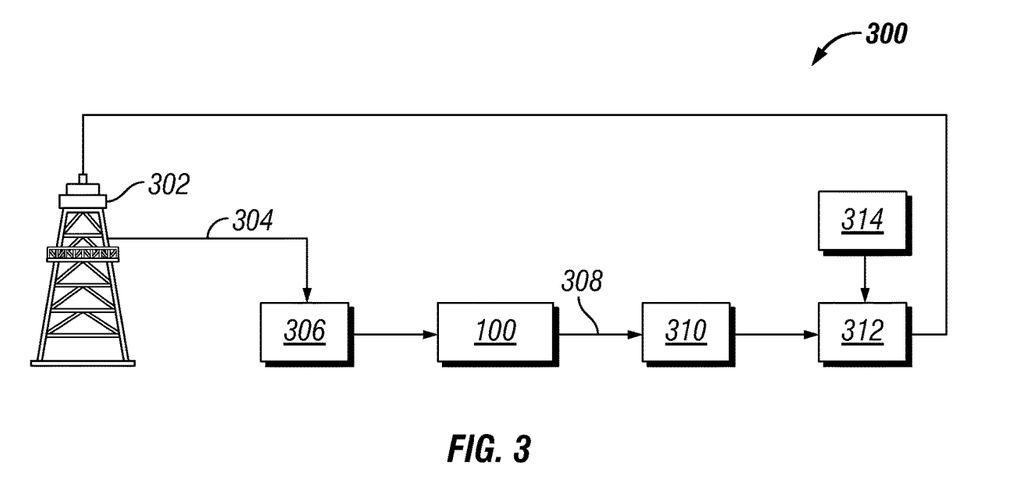
FIG. 3 illustrates a system and method recovering an invert emulsion from a spent drilling fluid at a well site and reconditioning it before returning it downhole.

FIG. 3 illustrates a process 300 for generating a recovered fluid emulsion at a drilling rig and preparing a drilling fluid including the recovered fluid emulsion. Drilling rig 302 may produce drilling waste 304 which may be discharged to waste storage 306. Waste storage 306 may include pits, tanks, tankers, or any other suitable medium for drilling waste storage. Drilling waste 304 may be transported to process 100 described in FIG. 1 which may produce a recovered fluid emulsion 308 as previously described. Recovered fluid emulsion 308 may be stored in recovered fluid storage 310 until needed or may be added directly back to a drilling mud storage, for example. Recovered fluid emulsion 308 may have some properties of drilling fluids but may need additional processing in mixing unit 312 to produce a drilling fluid with desirable properties. Mixing unit 312 may include sampling equipment configured to sample recovered fluid emulsion 308 and to determine physical and chemical properties of recovered fluid emulsion 308. Examples of testing that could be done are; rheology, gel strength, density, emulsion stability, oil-water-solids ratio, fluid loss properties, additive concentration and salinity of the recovered fluid. This testing could be automated and done in real-time or samples could be extracted and tested in a facility on-site. Once physical and chemical properties of the recovered emulsion are determined, additives from additive storage 314 may be added to the recovered emulsion to build a drilling fluid with desired properties. Some drilling fluid properties may include, for example, density, viscosity, fluid loss control, rheology, funnel viscosity, plastic viscosity, yield point, gel strength, pH, emulsion stability, among others. Additives may include water, oil, solids, brine, and chemical additives, for example. The drilling fluid may be then be returned to drilling rig 302. Alternatively, recovered fluid emulsion 308 may be added back to a drilling fluid without further processing and the combined fluid may be returned drilling rig 302.

Figure 4:
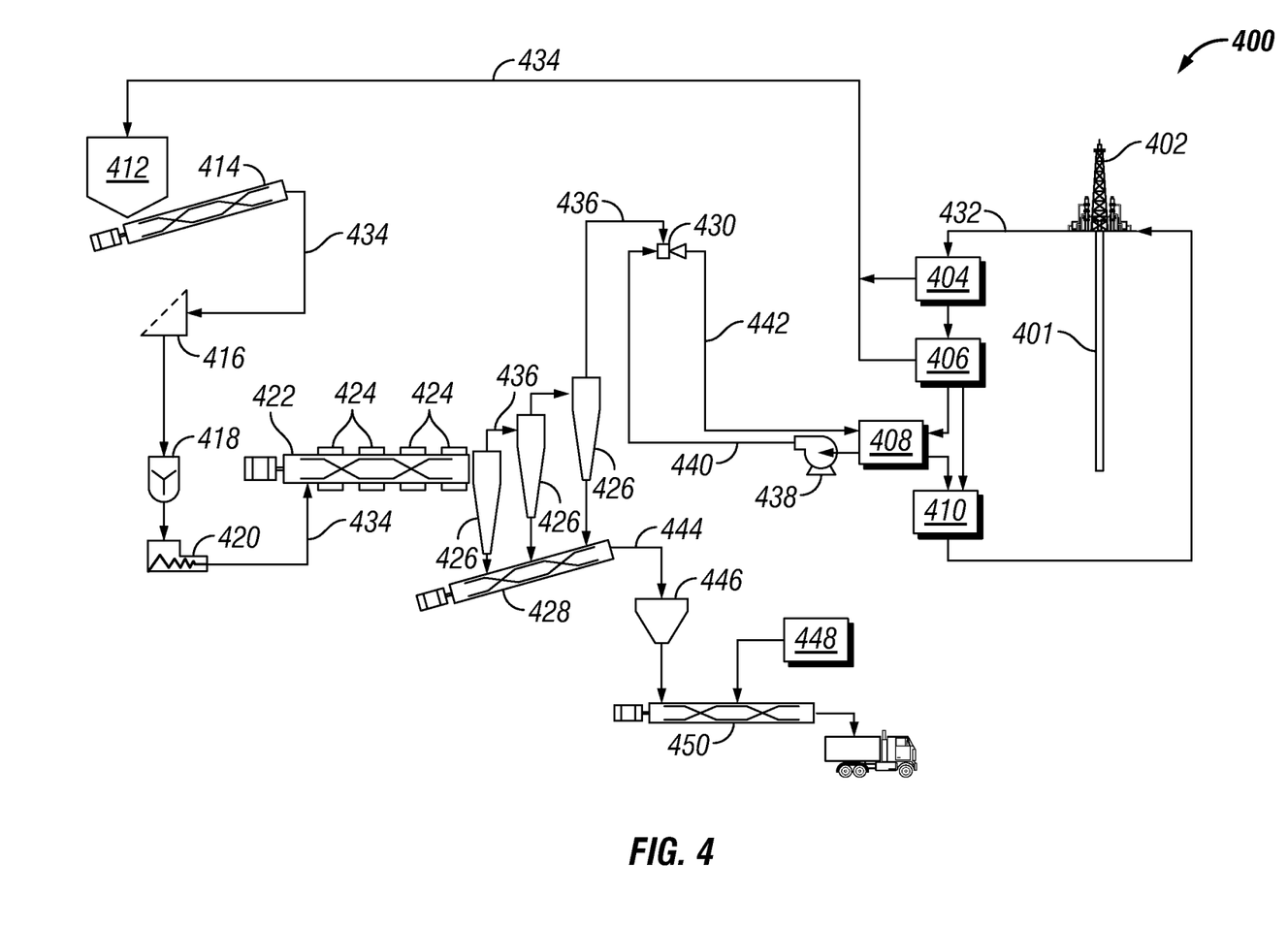
FIG. 4 illustrates a system and method using active drilling fluid as a condensing media to recover desorbed drilling fluids from drilling wastes at a rig site.

FIG. 4 illustrates process 400 whereby drilling waste is processed to produce a solids stream and a premix stream. Drilling waste can be any waste such as drilling fluid contaminated with solids and solids contaminated with drilling fluid. As drill cuttings are removed from drilling fluid, some drilling fluid may remain adsorbed on the cuttings. The adsorbed drilling fluid may be not be returned to pit and therefore the overall volume of drilling fluid is reduced over time and should be replenished. Process 400 may recover the drilling fluid from solids and preserve the total volume of drilling fluid. Process 400 utilizes drilling fluid from an active rig as a condensing fluid for recovering a fluid emulsion.

Solids-laden drilling fluid 432 may be produced from drilling rig 402 during the drilling of wellbore 401. Drilling fluid may be circulated during the drilling of wellbore 401 as previously described which may contaminate the drilling fluid with cuttings to produce solids-laden drilling fluid 432. Solids-laden drilling fluid 432 may be conveyed to shaker unit 404 which may include shaker screens and shaker tanks. Shaker unit 404 may be configured to remove at least a portion relatively larger cuttings and solids from solids-laden drilling fluid 432. From shaker unit 404, solids-laden drilling fluid 432 may further conveyed to centrifuge unit 406. Centrifuge unit 406 may include equipment such as centrifuges and cyclones configured to remove at least a portion of relatively smaller cuttings that were not removed in shaker unit 404. As discussed above, the drilling process may generate fines that not readily separated from drilling fluids using gravitational or centrifugal separation techniques such that the solids not removed may accumulate in the drilling fluid over time.

Solids-laden stream 434 may be drawn from at least one of shaker unit 404 or centrifuge unit 406. Solids-laden stream 434 may include the solids separated from shaker unit 404 or centrifuge unit 406 which may include drilling fluid adsorbed thereon. In an embodiment, solids-laden stream 434 may include solids separated from shaker unit 404 or centrifuge unit 406 and a portion of solids-laden drilling fluid 432. In an embodiment, solids-laden drilling fluid 432 may entirely bypass of shaker unit 404 or centrifuge unit 406 and be directly conveyed to tank 412. Solids-laden stream 434 may include any volume of solids at a point in a range of about 1% to about 99% solids.

Solids-laden stream 434 may be conveyed to tank 412 for storage before further processing. Conveyance 414 may optionally convey solids-laden stream 434 from tank 412 to vibrating screen 416 to eliminate foreign debris from entering downstream equipment. Solids-laden stream 434 may be conditioned in mixer 418 and pumped to heating unit 422 by pump 420. Conveyance 414 may include equipment such as, without limitation, augers, mixer hoppers, pumps, and other equipment configured to mix and/or convey solids-laden stream 434.

Heating unit 422 may include a vessel into which solids-laden stream 434 may be introduced by pump 420. The vessel may include a conveyance mechanism such as screws, for example, that may convey and mix solids-laden stream 434 through a length of low temperature heating unit 422. Conveying and mixing solids-laden stream 434 may allow for more even heat distribution within heating unit 210. A plurality of heating elements 424 may be disposed on, within, or near heating unit 422 to supply heat to heating unit 422. Heating elements 424 may include any suitable heating element including heating elements such as electric resistive heating elements embedded in the vessel, electric resistive heating elements disposed around the vessel to provide radiant heat into the vessel, a fired heater such as a furnace, or any other suitable heating element. In another embodiment, heat may be supplied by frictional heating. In a frictional heating embodiment, a screw or auger may compress and push solid particulate together, thereby causing friction between the solid particulates and raising the temperature of the solids-laden drilling fluid. In some examples, heating unit 422 may include control systems configured to regulate a temperature within the vessel such that the temperature and rate of heat transfer into material within heating unit 422 is controlled. The control system may increase or reduce temperature by controlling the heating element, for example.

Heating unit 422 may be operated at any temperature suitable for generating vapor stream 436. For example, heating unit 422 may be operated at a temperature at a point in a range of about 100° C. to about 500° C. Alternatively, heating unit 104 may be operated at a temperature at a point in a range of about 100° C. to about 150° C., at a point in a range of about 150° C. to about 200° C., at a point in a range of about 200° C. to about 250° C., at a point in a range of about 250° C. to about 300° C., at a point in a range of about 300° C., to about 350° C., at a point in a range of about 350° C. to about 400° C., at a point in a range of about 400° C. to about 450° C., or at a point in a range of about 450° C. to about 500° C. In a particular example, heating unit 422 may be operated within a temperature range of about 300° C. to about 500° C.

Heating unit 422 may be operated at any pressure suitable for generating vapor stream 436. For example, heating unit 422 may operate at a pressure less than atmospheric pressure (101.325 kPa) including at a pressure at a point in a range of about 0 kPa to about 94 kPa. Alternatively, heating unit 422 may operate at a pressure at a point in a range of about 0 kPa to about 10 kPa, at a point in a range of about 10 kPa to about 20 kPa, at a point in a range of about 20 kPa to about 30 kPa, at a point in a range of about 30 kPa to about 40 kPa, at a point in a range of about 40 kPa to about 50 kPa, at a point in a range of about 50 kPa to about 60 kPa, at a point in a range of about 60 kPa to about 70 kPa, at a point in a range of about 70 kPa to about 80 kPa, or at a point in a range of about 80 kPa to about 94 kPa. In a particular embodiment, heating unit 422 may operate at a pressure at a point in a range of about 30 kPa to about 70 kPa.

As solids-laden stream 434 is introduced into heating unit 422, the heat supplied by the heating element 424 may increase the temperature of materials within heating unit 422 thereby causing at least a portion of the oil and water present in to vaporize. In some examples, heating unit 422 may be configured to remove substantially all of the oil and water that will vaporize at the operating temperature and pressure of heating unit 422. As heating unit 422 is operated under vacuum, the boiling point of water and oils present may be lower than the boiling point at normal atmospheric pressure of 101.235 kPa. The operating conditions of heating unit 422 may allow a greater fraction of oils and water to vaporize as compared to if heating unit 422 were operated at or near atmospheric pressure. Furthermore, the operating conditions of heating unit 422 may reduce or eliminate cracking reactions which may lead to degradation of oils. There may be heavy hydrocarbons present in materials introduced into heating unit 422 which do not substantially vaporize at the operating condition of heating unit 422. Such heavy hydrocarbons may remain in a solid or liquid phase as they traverse a length of heating unit 422.

The vaporized water and oil as well as any remaining solids and liquids may be conveyed to one or more cyclones 426. Cyclones 426 may separate solids entrained in the vaporized oil and water to produce vapor stream 436 and bottoms stream 444. Bottoms stream 444 may include solids from solids-laden stream 434 as well as solids and liquids which were not vaporized in heating unit 422. Bottoms stream 444 may be conveyed by conveyance 428 to storage 446. Bottoms stream 444 may optionally be re-wet with water from tank 448 either within storage 446 or in conveyance 450. Re-wetting solids may allow for safer transport of solids waste as wet solids are less likely to become airborne. The bottoms stream may be hauled for disposal or further processing.

Vapor stream 436 may be drawn into eductor 430 and be contacted with drilling fluid stream 440 thereby causing vapor stream 436 to at least partially condense and be incorporated into the bulk liquid phase of the drilling fluid. As discussed above, heating unit 422 operates at a pressure below atmospheric. The reduced pressure in heating unit 422 is provided by a vacuum generated from eductor 430. Eductor 430 may be considered a jet pump that is able to transfer energy from one fluid to another via the Venturi effect. The structure of eductor 430 may be such that drilling fluid stream 440 from pump 438 flowing into eductor 430 which causes a pressure drop within eductor 430. The pressure drop within eductor 430 causes a pressure drop in equipment upstream of eductor 430, including within heater 422. In general, a relatively higher the volumetric flow rate provided by pump 438 will result in a relatively higher pressure drop within eductor 430 which in turn results in a lower the pressure within heating unit 422. Thus, the operating pressure of heating unit 422 may be controlled by adjusting a volumetric flow rate of pump 438, for example.

One advantage of utilizing an eductor to reduce pressure in heating unit 422 may be a reduction in complexity as an eductor has no moving parts. Furthermore, utilizing an eductor allows recovery of a recovered fluid emulsion without the need to separate individual components of oil and water separately. Vapor stream 436 is drawn into eductor 430 by the reduced pressure generated by drilling fluid stream 440 flowing through eductor 430. Within eductor 430 and flow line 442, vapors from vapor stream 436 and drilling fluid from drilling fluid stream 440 come in contact thereby cooling and condensing the oil and water vapors to a liquid. The condensed oil and water are mixed with the drilling fluid and incorporated into the bulk fluid volume. The resultant fluid may be considered a slightly diluted drilling fluid. In general, the dilution rate of the drilling fluid by condensed oil and water may not be substantial compared to the total drilling fluid volume and therefore may not materially affect drilling fluid properties to render the diluted drilling fluid unsuitable for drilling. Rather, the methods described herein preserve drilling fluid volume by recovering a majority of the drilling fluid adsorbed on solids and returning the drilling fluid to the drilling process. The diluted drilling fluid may be returned to drilling fluid storage 408. Drilling fluid storage 408 may be tanks, pits, tankers, or any other containers suitable for storing drilling fluid.

A mobile mud plant 410 may be present to condition drilling fluid from drilling fluid storage 408 before conveying the drilling fluid to drilling rig 402. Mobile mud plant 410 may include sensors and testing apparatuses that can measure properties of the drilling fluid and equipment to mix water, oil, and additives into the drilling fluid. Examples of testing that could be done are; rheology, gel strength, density, emulsion stability, oil-water-solids ratio, fluid loss properties, additive concentration and salinity of the recovered fluid. This testing could be automated and done in real-time or samples could be extracted and tested in a facility on-site. Once physical and chemical properties of the drilling fluid are determined, additives may be added to build a drilling fluid with desired properties. Some drilling fluid properties may include, for example, density, viscosity, fluid loss control, rheology, funnel viscosity, plastic viscosity, yield point, gel strength, pH, emulsion stability, among others.

Statement 1. A method comprising: heating a drilling waste comprising water, oil, and solid particulate; vaporizing at least a portion of the water and oil from the drilling waste to form a vaporized fluid, wherein the step of vaporization is performed at a pressure less than about 101.325 kPa; and condensing the at least a portion of the water and oil to form a recovered fluid emulsion.

Statement 2. The method of statement 1 further comprising: combining the recovered fluid emulsion with at least one of water, oil, or drilling fluid additive to form a drilling fluid.

Statement 3. The method of any of statements 1-2 wherein the step of combining the recovered fluid emulsion with at least one of water, oil, or drilling fluid additive to form the drilling fluid is performed at a drill site and the drilling fluid is further introduced into a drill string.

Statement 4. The method of any of statements 1-3 wherein the step of combining the recovered fluid emulsion with at least one of water, oil, or drilling fluid additive to form the drilling fluid is performed at a mud plant and the drilling fluid is transported to a drill site.

Statement 5. The method of any of statements 1-4 wherein the drilling waste is in the form of an invert emulsion.

Statement 6. The method of any of statements 1-5 wherein the step of heating comprises heating the drilling waste in a heating unit, the heating unit comprising a heating element and a conveyance.

Statement 7. The method of any of statements 1-6 wherein the heating element comprises an electric heater, a fired heater, a thermal screw, or a combination thereof.

Statement 8. The method of any of statements 1-7 further comprising drawing the vaporized fluid into an eductor.

Statement 9. The method of any of statements 1-8 further comprising: pumping a drilling fluid into the eductor thereby generating a pressure drop within the eductor and causing the vaporized fluid to be drawn into the eductor; contacting the vaporized fluid and the drilling fluid within the eductor; and condensing at least a portion of the vaporized fluid with the drilling fluid to form the recovered fluid emulsion.

Statement 10. The method of any of statements 1-9 further comprising: pumping the recovered fluid emulsion into the eductor thereby generating a pressure drop within the eductor and causing the vaporized fluid to be drawn into the eductor; contacting the vaporized fluid and the recovered fluid emulsion within the eductor; and condensing at least a portion of the vaporized fluid with the recovered fluid emulsion to form the recovered fluid emulsion.

Statement 11. A method comprising: introducing a drilling fluid solids stream into a heating unit, wherein the drilling fluid solids stream comprises drill cuttings and drilling fluid, and wherein the drilling fluid comprises water and oil; heating the drill cuttings and drilling fluid in the heating unit, wherein the heating unit is operated at a pressure of less than 101.325 kPa; vaporizing at least a portion of the water and the oil to form a vaporized fluid; and condensing at least a portion of the vaporized fluid to form a recovered fluid emulsion.

Statement 12. The method of statement 11 wherein the drilling fluid solids stream contains greater than 70% by volume drill cuttings.

Statement 13. The method of any of statements 11-12 wherein the step of condensing comprises: drawing the vaporized fluid into an eductor and contacting the vaporized fluid with a drilling fluid within the eductor.

Statement 14. The method of any of statements 11-13 wherein the drilling fluid is pumped into the eductor thereby causing a pressure drop within the eductor and drawing the vaporized fluid into the eductor.

Statement 15. The method of any of statements 11-14 wherein the eductor and heating unit are fluidically coupled and causing a pressure drop within the eductor causes a pressure in the heating unit to decrease to less than 101.325 kPa.

Statement 16. The method of any of statements 11-15 wherein the heating unit is operated at a pressure at a point in a range of about 30 kPa to about 70 kPa and a temperature at a point in a range of about 300° C. to about 500° C.

Statement 17. A system comprising: a heating unit having an inlet to receive a drilling waste and an outlet for a vapor stream comprising oil and water components of the drilling waste generated in the heating unit; an eductor fluidically coupled to the outlet of the heating unit; and a drilling fluid supply fluidically coupled to an inlet of the eductor.

Statement 18. The system of statements 17 wherein the eductor is configured to generate a pressure drop from flowing a drilling fluid from the drilling fluid supply through the eductor and draw the vapor stream into the eductor.

Statement 19. The system of any of statements 17-18 wherein the eductor is further configured to allow the vapor stream and the drilling fluid to come in contact.

Statement 20. The system of any of statements 17-19 further comprising one or more cyclones disposed between the heating unit and the eductor.

It should be understood that, although individual examples may be discussed herein, the present disclosure covers all combinations of the disclosed examples, including, without limitation, the different component combinations, method step combinations, and properties of the system.

It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces.

All numerical values within the detailed description and the claims herein modified by "about" or "approximately" with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The exemplary drilling fluid disclosed herein may directly or indirectly affect one or more components or pieces of equipment associated with the preparation, delivery, recapture, recycling, reuse, and/or disposal of the drilling fluid. For example, the treatment fluid particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the drilling fluid. The drilling fluid may also directly or indirectly affect any transport or delivery equipment used to convey the drilling fluid to a well site or downhole such as, for example, any transport vessels, conduits, pipelines, trucks, tubulars, and/or pipes used to compositionally move the drilling fluid from one location to another, any pumps, compressors, or motors (e.g., topside or downhole) used to drive the drilling fluid into motion, any valves or related joints used to regulate the pressure or flow rate of the drilling fluid particulates (or fluids containing the same drilling fluid particulates), and any sensors (i.e., pressure and temperature), gauges, and/or combinations thereof, and the like. The disclosed treatment fluids may also directly or indirectly affect the various downhole equipment and tools that may come into contact with the drilling fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

What is claimed is:

1. A method comprising:
heating a drilling waste comprising water, oil, and solid particulate in a heating unit, wherein the heating unit is operated at a temperature of about 300° C. to about 500° C.;
vaporizing at least a portion of the water and oil from the drilling waste to form a vaporized fluid, wherein the step of vaporization is performed at a pressure less than about 101.325 kPa;
condensing the at least a portion of the water and oil from the drilling waste to form a recovered fluid emulsion;
testing the recovered fluid emulsion with a mobile mud plant that is fluidly coupled to a wellbore;
conditioning the recovered fluid emulsion by adding weighting agents to the recovered fluid emulsion based on a result of the testing;
conveying the conditioned recovered fluid emulsion from the mobile mud plant to the wellbore; and
forming a partially recycled drilling fluid by diluting a spent drilling fluid with the conditioned recovered fluid emulsion; and
introducing the partially recycled drilling fluid into a drill string,
wherein the steps of vaporizing and condensing at least a portion of the water and oil from the drilling waste are performed simultaneously, and testing and conditioning are performed at a drill site.

2. The method of claim 1 further comprising:
combining the recovered fluid emulsion with at least one of water, oil, or drilling fluid additive.

3. The method of claim 2 wherein the step of combining the recovered fluid emulsion with at least one of water, oil, or drilling fluid additive is performed at the drill site.

4. The method of claim 2 wherein the step of combining the recovered fluid emulsion with at least one of water, oil, or drilling fluid additive is performed at a mud plant and the drilling fluid is transported to a drill site.

5. The method of claim 1 wherein the drilling waste is in the form of an invert emulsion.

6. The method of claim 1 wherein the heating unit comprises a heating element and a conveyance.

7. The method of claim 6 wherein the heating element comprises an electric heater, a fired heater, a thermal screw, or a combination thereof.

8. The method of claim 1 further comprising drawing the vaporized fluid into an eductor.

9. The method of claim 8 further comprising:
pumping a drilling fluid into the eductor thereby generating a pressure drop within the eductor and causing the vaporized fluid to be drawn into the eductor;
contacting the vaporized fluid and the drilling fluid within the eductor; and
condensing at least a portion of the vaporized fluid with the drilling fluid to form the recovered fluid emulsion.

10. The method of claim 8 further comprising:
pumping the recovered fluid emulsion into the eductor thereby generating a pressure drop within the eductor and causing the vaporized fluid to be drawn into the eductor;
contacting the vaporized fluid and the recovered fluid emulsion within the eductor; and
condensing at least a portion of the vaporized fluid with the recovered fluid emulsion to form the recovered fluid emulsion.

11. A method comprising:
introducing a drilling fluid solids stream into a heating unit operated at a temperature of about 300° C. to about 500° C., wherein the drilling fluid solids stream comprises drill cuttings and drilling fluid, and wherein the drilling fluid comprises water and oil;
heating the drill cuttings and drilling fluid in the heating unit, wherein the heating unit is operated at a pressure of less than 101.325 kPa;
vaporizing at least a portion of the water and the oil to form a vaporized fluid;
condensing at least a portion of the vaporized fluid to form a recovered fluid emulsion;
testing the recovered fluid emulsion with a mobile mud plant that is fluidly coupled to a wellbore;
conditioning the recovered fluid emulsion by adding weighting agents to the recovered fluid emulsion based on a result of the testing;
conveying the conditioned recovered fluid emulsion from the mobile mud plant to the wellbore; and
forming a partially recycled drilling fluid by diluting a spent drilling fluid with the conditioned recovered fluid emulsion; and
introducing the partially recycled drilling fluid into a drill string,
wherein the steps of vaporizing and condensing at least a portion of the water and oil from the drilling waste are performed simultaneously, and wherein testing and condition are performed at a drill site.

12. The method of claim 11 wherein the drilling fluid solids stream contains greater than 70% by volume drill cuttings.

13. The method of claim 11 wherein the step of condensing comprises:
drawing the vaporized fluid into an eductor and contacting the vaporized fluid with a drilling fluid within the eductor.

14. The method of claim 13 wherein the drilling fluid is pumped into the eductor thereby causing a pressure drop within the eductor and drawing the vaporized fluid into the eductor.

15. The method of claim 14 wherein the eductor and heating unit are fluidically coupled and causing a pressure drop within the eductor causes a pressure in the heating unit to decrease to less than 101.325 kPa.

16. The method of claim 11 wherein the heating unit is operated at a pressure of about 30 kPa to about 70 kPa.

17. A system comprising:
a heating unit operated at a temperature of about 300° C. to about 500° C., having an inlet to receive a drilling waste and an outlet for a vapor stream comprising oil and water components of the drilling waste generated in the heating unit, wherein at least a portion of the water and oil components are vaporized simultaneously and at a pressure of less than about 101.325 kPa;
an eductor fluidically coupled to the outlet of the heating unit, wherein the vapor stream is drawn therein;
a drilling fluid supply fluidically coupled to an inlet of the eductor, wherein the eductor is configured to allow the vapor stream and the drilling fluid to make contact, wherein the contact at least partially condenses the vapor stream to form a recovered fluid emulsion; and a mobile mud plant fluidly coupled to a wellbore and the eductor, the mobile mud plant positioned downstream to the eductor, the wellbore positioned downstream to the mobile mud plant, the mobile mud plant configured to test the recovered fluid emulsion, condition the recovered fluid emulsion based on the test, and convey the conditioned recovered fluid emulsion to the wellbore, wherein the mobile mud plant is configured to condition the recovered fluid emulsion by adding weighting agents to the recovered fluid emulsion based on a result of the test, thereby forming a conditioned recovered fluid emulsion;

a spent drilling fluid diluted with the conditioned recovered fluid emulsion to form a partially recycled drilling fluid, wherein the partially recycled drilling fluid is introduced into a drill string.

18. The system of claim 17 wherein the eductor is configured to generate a pressure drop from flowing the drilling fluid from the drilling fluid supply through the eductor and draw the vapor stream into the eductor.

19. The system of claim 17 further comprising one or more cyclones disposed between the heating unit and the eductor.

20. The system of claim 17 wherein the at least partially condensed vapor stream is incorporated into a bulk liquid phase of the drilling fluid.

\* \* \* \* \*